Patented Dec. 2, 1930

1,783,200

UNITED STATES PATENT OFFICE

HEINRICH RÖSSNER, ADOLF STEINDORFF, AND KASPAR PFAFF, OF HOCHST-ON-THE-MAIN, GERMANY, ASSIGNORS TO FARBWERKE VORM. MEISTER LUCIUS AND BRUNING, OF HOCHST-ON-THE-MAIN, GERMANY, A CORPORATION OF GERMANY

DRESSING SEED

No Drawing. Application filed October 8, 1925, Serial No. 61,352, and in Germany October 15, 1924.

Dry agents used for dressing seeds by dusting contain fungicidal compounds of different kinds. In order to obtain a uniform treatment of the seeds with such a dry dressing agent, of which only a small quantity should be employed, it is necessary that the fungicidal compound be in an extremely finely powdered dust-like state. The dusting of the fungicidal compound involves a great annoyance for the farmer. The dry dressing agent ordinarily is transported either in very primitive or not sufficiently tight receptacles; moreover it is necessary in emptying the receptacles to fill the dressed seeds into a bag from which they are again discharged into the drilling barrow. These manipulations cause the emission of a great deal of dust when using the hitherto employed dry dressing agents which may even be injurious to the health of the workman who handles them, because of the toxic properties of the fungicidal compounds which they contain.

Now we have found that the nuisance due to the dusting of the dry dressing agents can be obviated by adding a slight quantity of an oil.

We give hereafter some examples of mixtures which may be advantageously used for the purpose in question:

(1) A mixture composed of: 30 parts of copper carbonate, 30 parts of sulfonate of resin, 5 parts of phenylarsenic acid, 32 parts of kieselguhr. By adding to this mixture 3 parts of an oil, its properties are altered so much that, while remaining in such a finely divided state that the seeds can be uniformly treated therewith, it entirely loses its property of emitting dust.

(2) A mixture composed of: 14 parts of calomel, 7 parts of phenylarsenic oxide, 35 parts of a sulfonate of resin, 42 parts of an indifferent extender, for instance talc. By adding to this mixture 2 parts of spindle oil, the mixture is completely deprived of its property of emitting dust.

(3) A mixture composed of: 20 parts of mercury chlorophenol, 30 parts of sodium hydroxide or sodium sulfate, 48 parts of talc. By adding to this mixture 2 parts of resin oil the mixture is so much altered that its great tendency of emitting dust is entirely removed without impairing its efficiency.

(4) A mixture composed of: 14 parts of copper carbonate, 7 parts of calomel, 7 parts of phenylarsenic acid, 40 parts of a sulfonate of resin, 30 parts of kieselguhr or china clay or talc. By adding to this mixture 2 parts of bone oil (Dippel's oil) or train oil, the mixture is deprived of its property of emitting dust and thereby injuring the health of the workman who handles it.

In the same way other mixtures may be mixed with an oil, whereby their property of emitting much dust is removed without reducing their efficacy. Such a dry dressing agent which has been impregnated with an oil and consequently has lost its property of emitting dust, may be applied even without the aid of a dressing apparatus, by spraying it over a heap of corn.

For instance 50 kg. of wheat seeds are sprayed over with 150 gr. of the dressing agent and when this heap of seeds is stirred in the same manner as is done by the hitherto practised wetting method, the dressing agent is distributed all over the grains.

We claim:

1. A composition of matter comprising about 32 to 48 parts of an indifferent extender, about 30 to 40 parts of a sulfonate of resin and about 2 to 3 parts of an oily material, the remainder of the composition being a metal-containing compound possessing a fungicidal action.

2. A composition of matter comprising about 30 parts of copper carbonate, about 30 parts of sulfonate of resin, about 5 parts of phenylarsenic acid, about 32 parts of kieselguhr and about 3 parts of an oily material.

In testimony whereof, we affix our signatures.

HEINRICH RÖSSNER.
ADOLF STEINDORFF.
KASPAR PFAFF.

CERTIFICATE OF CORRECTION.

Patent No. 1,783,200.            Granted December 2, 1930, to

HEINRICH ROSSNER ET AL.

It is hereby certified that the above numbered patent was erroneously issued to "Farbwerke Vorm. Meister Lucius and Bruning, of Hochst-on-the-Main, Germany, a Corporation of Germany", whereas said patent should have been issued to I. G. Farbenindustrie Aktiengesellschaft, of Frankfurt A. M., Germany, said corporation being assignee by mesne assignments of the entire interest in said invention, as shown by the records of assignments in this office; and that the said Letters Patent should be read with this correction therein that the same may conform to the record of the case in the Patent Office.

Signed and sealed this 6th day of January, A. D. 1931.

(Seal)                                                   M. J. Moore,
                                                           Acting Commissioner of Patents.